United States Patent Office 2,991,293
Patented July 4, 1961

2,991,293
NEW EPOXY COMPOUNDS
Hans Batzer, Arlesheim, and Erwin Nikles, Basel, Switzerland, assignors to Ciba Limited, Basel, Switzerland
No Drawing. Filed Nov. 3, 1959, Ser. No. 850,509
Claims priority, application Switzerland Nov. 20, 1958
3 Claims. (Cl. 260—340.7)

The present invention provides new epoxy compounds of the general formula

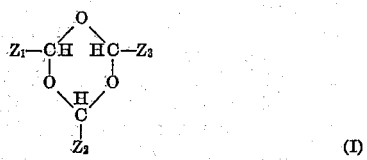

(I)

in which $Z_1$ and $Z_2$ each represent a residue of the formula

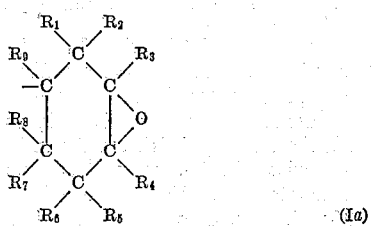

(Ia)

where $R_1$ to $R_9$ each represent a monovalent substituent, such as a halogen atom, or an alkoxy group, or an aliphatic, cycloaliphatic, araliphatic or aromatic hydrocarbon radical, and more especially an alkyl radical containing 1 to 4 carbon atoms, or a hydrogen atom, and where $R_1$ and $R_5$ together may also represent a divalent substituent, such as a methylene group, and in which $Z_3$ either has the same meaning as $Z_1$ or $Z_2$, or represents a hydrogen atom or a saturated aliphatic residue which may be substituted, for example by a halogen atom.

Among the compounds of the Formula I the epoxides of the formula

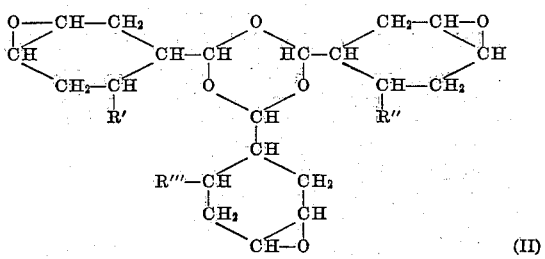

(II)

in which R′, R″ and R‴ each represent a hydrogen atom or a methyl group—are distinguished by their especially ready accessibility.

The compounds of the Formula I are obtained when a trimeric unsaturated aldehyde of the formula

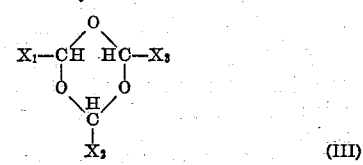

(III)

in which $X_1$ and $X_2$ each represent a residue of the formula

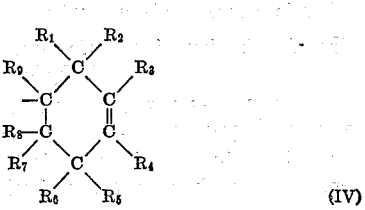

(IV)

where the residues $R_1$ to $R_9$ have the same meaning as in the Formula Ia and $X_3$ either has the same meaning as the symbol $X_1$ or $X_2$ or represents a hydrogen atom or a saturated aliphatic radical—is treated with an epoxidising agent.

The trioxans of the Formula III are prepared in the usual manner by trimerisation of aldehydes of the formula

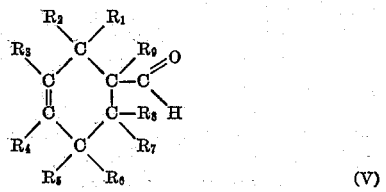

(V)

or mixtures of different aldehydes of the composition corresponding to Formula V, or of mixtures of aldehydes of the Formula V with saturated aliphatic aldehydes in the presence of a suitable catalyst, such as hydrochloric acid, sulfuric acid or the like and more especially of boron trifluoride or a complex thereof, such as boron trifluoride etherate.

Among the aldehydes of the Formula V there may be mentioned as examples 6-methyl-$\Delta^3$-tetrahydrobenzaldehyde, 4-methyl-$\Delta^3$-tetrahydrobenzaldehyde, 2:5-endomethylene-$\Delta^3$-tetrahydrobenzaldehyde, 4-chloro-$\Delta^3$-tetrahydrobenzaldehyde and above all $\Delta^3$-tetrahydrobenzaldehyde.

Examples of suitable saturated aliphatic aldehydes are: formaldehyde, acetaldehyde, propionaldehyde, butyraldehyde, oenanthaldehyde, isobuturaldehyde; chloracetaldehyde, dichloracetaldehyde, chloral, $\beta$-chlorobutyraldehyde and $\alpha:\beta$-dichlorobutyraldehyde.

The epoxidation of the trimeric aldehydes of Formula III to form the epoxy compounds of the invention is performed by a conventional method, advantageously with the aid of an organic peracid, such as peracetic acid, perbenzoic acid, peradipic acid, monoperphthalic acid or the like. Another suitable epoxidising agent is hypochlorous acid; when this epoxidising agent is used the double bond adds hypochlorous acid in the first stage and then in the second stage the epoxide group is formed on treatment with an agent capable of splitting off hydrochloric acid, such as a strong alkali.

Owing to side-reactions occurring during the epoxidation, there may be formed in addition to the diepoxides or triepoxides respectively also wholly or only partially hydrolysed epoxides, that is to say compounds in which the epoxide groups of the polyepoxide of the Formula I have been wholly or partially hydrolysed to form hydroxyl groups.

It has been observed that the presence of such byproducts in general has an advantageous effect on the technical properties of the hardened polyepoxides. It is, therefore, in general of advantage not to isolate the pure polyepoxides from the reaction mixture.

The epoxy compounds of the invention react with the conventional hardeners for epoxy compounds. They can therefore be cross-linked or hardened like other polyfunctional epoxy compounds or epoxy resins by adding such hardeners. As such hardeners are suitable basic compounds or more especially acidic compounds.

The following compounds have proved suitable as such hardeners: Amines or amides, such as aliphatic or aromatic primary, secondary or tertiary amines, for example mono-, di- and tri-butylamines, para-phenylenediamine, bis-[para-aminophenyl]-methane, ethylenediamine, N:N-diethyl-ethylenediamine, diethylene triamine, tetra-[hydroxyethyl]-diethylene triamine, triethylene-tetramine, tetraethylene-pentamine, trimethylamine, diethylamine, triethanolamine, Mannich's bases, piperidine, piperazine, guanidine and guanidine derivatives such as phenyl diguanidine, diphenyl guanidine, dicyandiamide, aniline-formaldehyde resins, urea-formaldehyde resins, melamine-formaldehyde resins, polymers of aminostyrenes, polyamides, for example those of aliphatic polyamines with dimerised or trimerised unsaturated fatty acids, isocyanates, isothiocyanates; polyhydric phenols, for example resorcinol, hydroquinone, bis [4 - hydroxyphenyl]-dimethylmethane, quinone, phenol-aldehyde resins, oil-modified phenol-aldehyde resins, reaction products of aluminium alcoholates or phenolates with compounds of tautomeric reaction of the type of acetoacetic ester, Friedel-Crafts catalysts, for example aluminium chloride, antimony pentachloride, stannic chloride, zinc chloride and boron trifluoride and their complexes with organic compounds; or phosphoric acid. Preferred hardners are polybasic carboxylic acids and anhydrides thereof, for example phthalic anhydride, methyl-endomethylene-terahydrophthalic anhydride, dodecenyl-succinic anhydride, hexahydrophthalic anhydride, hexachloro-endomethylene-tetrahydrophthalic anhydride or endomethylene-tetrahydrophthalic anhydride, or mixtures of two or more of these compounds; maleic anhydride or succinic anhydride, and if desired an accelerator such as a tertiary amine, and advantageously also a polyhdroxy compound such as hexanetriol or glycerol can be further added.

It has been observed that it is of advantage to perform the hardening of the epoxy resins of this invention with carboxylic acid anhydrides by using only about 0.3 to 0.9 gram equivalent of anhydride groups for every gram equivalent of epoxide groups. When a basic accelerator such as an alkali metal alcoholate or an alkali metal salt of a carboxylic acid is used, up to 1.0 gram equivalent of anhydride groups may be used.

The term "hardening" is used in this connection to signify the conversion of the afore-mentioned epoxy compounds into insoluble and infusible resins.

Accordingly, the present invention also includes hardenable mixtures containing the trioxans epoxidised according to the present process as well as hardeners for epoxy resins, above all such as di- or polycarboxylic acid anhydrides.

The hardenable mixtures of the invention advantageously further contain a proportion of the otherwise corresponding polyepoxides, except that their epoxide groups have been wholly or partially hydrolysed to hydroxyl groups and/or other polyhydroxy compounds having a cross-linking action, such as hexanetriol. It goes without saying that the hardenable epoxy compounds may also be admixed with other epoxides such, for example, as mono- or polyglycidyl ethers of mono- or polyalcohols such as butanol, butane-1:4-diol or glycerol, or of mono- or polyphenols such as resorcinol, bis-[4-hydroxyphenyl]-dimethylmethane or condensation products of aldehydes with phenols (novolaks), furthermore polyglycidyl esters of polycarboxylic acids such as phthalic acid, and also aminopolyepoxides such, for example, as those which are obtained by dehydrohalogenation of reaction products of epihalohydrins with primary or secondary amines, such as n-butylamine, aniline or 4:4′-di-[monomethylamino]-diphenyl-methane.

Before being hardened, the hardenable epoxy compounds or their mixtures with hardeners can at any stage of the process be admixed with fillers, plasticisers, coloring matters or the like. Examples of suitable extenders and fillers are asphalt, bitumen, glass fibers, mica, quartz powder, cellulose, kaolin, finely divided silicic acid (Aerosil) or metal powders.

The mixtures of the epoxy compounds of the invention with hardeners can be used, with or without addition of a filler, if desired in the form of a solution or emulsion, as textile assistants, laminating resins, paints, lacquers, dipping resins, casting resins, brushing compositions, fillers, putties, adhesives and the like, and they may also be used in the manufacture of such products. The addition of the new resins to insulating material for electrical purposes is of special value.

In the following examples, which illustrate the invention, parts and percentages are by weight, unless otherwise indicated, and the relationship between parts by weight and parts by volume is the same as that between the kilogram and the liter.

EXAMPLE 1

(a) *Trimerisation of $\Delta^3$-tetrahydrobenzaldehyde*

A mixture of 1101 parts of $\Delta^3$-tetrahydrobenzaldehyde and 2000 parts by volume of ether is treated with 40 parts by volume of an ethereal solution of boron trifluoride of 47.8% strength. The mixture comes to the boil, and at the same time the crystallization of the product sets in. The whole is kept for 3 days at room temperature, and the crystallizate is filtered off and washed with 500 parts by volume of ether and 500 parts by volume of methanol, and then dried in vacuo, to yield 890 parts (=81% of theory) of trimeric $\Delta^3$-tetrahydrobenzaldehyde melting at 170–173° C.

(b) *Epoxidation of trimeric $\Delta^3$-tetrahydrobenzaldehyde*

440 parts of trimeric $\Delta^3$-tetrahydrobenzaldehyde prepared as described above are dissolved in 3500 parts by volume of chloroform. 30 parts of anhydrous sodium acetate are added, and while vigorously stirring and cooling the mixture, it is treated within 30 minutes at 30° C. dropwise with 900 parts of commercial peracetic acid of 42% strength. The mixture is kept for 40 minutes at 30° C., cooled to 15° C. and left to itself for 2 hours. The supernatant aqueous phase is separated, and the chloroformic solution is successively washed with 700 and 1000 parts of water and twice with 700 parts by volume of 2 N-sodium carbonate solution on each occasion, dried over sodium sulfate and evaporated, to yield 507 parts of a completely colorless product containing 6.7 epoxide equivalents per kg.

For analysis the product is recrystallized from alcohol; the product then melts at 210–212° C.

$C_{21}H_{30}O_6$ Calculated: C, 66.64%; H, 7.99%; O, 25.37%. Found: C, 66.48%; H, 7.79%; O, 25.34%.

EXAMPLE 2

(a) *Trimerisation of 6-methyl-$\Delta^3$-tetrahydrobenzaldehyde*

248 parts of 6-methyl-$\Delta^3$-tetrahydrobenzaldehyde are treated with 5 parts by volume of an ethereal solution of boron trifluoride of 47.8% strength while being cooled, whereupon the temperature rises to 52° C. The mixture is kept for 1 day at room temperature and then treated with another 5 parts by volume of boron trifluoride solution, and the mixture is left to itself for 3 days at 50° C. After this time a dark, viscid mass has formed. The product is taken up in 600 parts by volume of ether and twice washed with 150 parts by volume of 2 N-potassium carbonate solution on each occasion. The ethereal solution is then dried over sodium sulfate and evaporated. The unreacted starting material is distilled off under a pressure of 12 mm. Hg at a temperature between 45 and 68° C., and all remaining readily volatile constituents are finally removed under a pressure of 0.01 mm. Hg and at a bath temperature of 160° C. in the course of 20 minutes. There remain 194 parts of a very brittle, brown resin.

The molecular weight, determined by Rast's method in camphor, is about 380 (theoretical molecular weight of trimeric 6-methyl-$\Delta^3$-tetrahydrobenzaldehyde: 372).

(b) *Epoxidation of trimeric 6-methyl-$\Delta^3$-tetrahydrobenzaldehyde*

A solution of 105 parts of trimeric 6-methyl-$\Delta^3$-tetrahydrobenzaldehyde prepared as described above in 500 parts by volume of benzene is treated with 6 parts of anhydrous sodium acetate, and while vigorously stirring and cooling the mixture 200 parts of peracetic acid of 42% strength are added dropwise at 30–34° C. in the course of 31 minutes. After 6 hours' reaction at room temperature, 81% of the theoretical amount of peracetic acid have been consumed. The aqueous layer is then separated and the benzolic layer is washed twice each with 250 parts of water, 250 parts by volume of 2 N-sodium carbonate solution and 100 parts by volume of molar monosodium phosphate solution. The benzolic solution is then dried over sodium sulfate and evaporated. After drying in a high vacuum, 116 parts of substance containing 3.1 epoxide equivalents per kg. are obtained.

EXAMPLE 3

To prepare a casting resin mixture an epoxy resin that is liquid at room temperature and has been obtained by condensing 4:4' - dihydroxy - diphenyl dimethylmethane with epichlorohydrin in the presence of aqueous sodium hydroxide solution, and which contains 5.1 gram equivalents of epoxide groups per kg. (=resin A), is mixed with different proportions of the epoxy compound described in Example 1 (=resin B) as well as with phthalic anhydride, 0.85 gram equivalent of anhydride groups being used for every gram equivalent of epoxide groups in epoxy resins A and B.

The mixtures prepared in this manner are poured into moulds and hardened by being heated for 14 hours at 140° C. Test bars (60 x 10 x 4 mm.) are cut out of the resulting castings, and they display the following properties:

| Test | Composition of epoxy mixture | Bending strength in kg./sq. mm. | Impact bending strength in cmkg./sq. cm. | Martens value (DIN), degrees |
|---|---|---|---|---|
| 1 | 100% resin A | 12.0 | 9.0 | 120 |
| 2 | 66.6% resin A+33.4% resin B | 13.0 | 6.75 | 130 |
| 3 | 50% resin A+50% resin B | 12.3 | 8.5 | 141 |
| 4 | 33.4% resin A+66.6% resin B | 2.6 | 1.4 | 130 |
| 5 | 100% resin B | 2.5 | 2.5 | 112 |

EXAMPLE 4

A mixture of 880 parts of Δ³-tetrahydrobenzaldehyde, 352 parts of acetaldehyde and 1600 parts by volume of ether is treated with 40 parts by volume of a boron trifluoride-ethyl etherate solution of 47.8% strength. The reaction is very strongly exothermic. The reaction mixture is kept for 14 hours, and the crystalline trimeric Δ³-tetrahydrobenzaldehyde so formed is filtered off. The filtrate is washed 3 times with 200 parts by volume of 2 N-sodium carbonate solution and 3 times with 200 parts of water on each occasion. The solution is dried over sodium sulfate, filtered and evaporated. The residue is distilled under reduced pressure over 0.5 part of anhydrous sodium carbonate. The distillate is collected in 3 fractions:

Fraction: Boiling point
1 ———————————— 45–78° C./18 mm. Hg
2 ———————————— 74–96° C./0.2 mm. Hg
3 ———————————— 96–125° C./0.2 mm. Hg When fraction 2 is again distilled, it yields 117 parts of 2:4-dimethyl-6-[Δ³'-cyclohexenyl]-trioxen boiling at 116–119° C. under 18 mm. Hg pressure.

$Analysis.$—$C_{11}H_{18}O_3$ Calculated: C, 66.64%; H, 9.15%. Found: C, 66.90%; H, 9.38%.

The 3rd fraction yields 155 parts of 2-methyl-4:6-di-[Δ³'-cyclohexenyl]-trioxan boiling at 103–110° C. under 0.03 mm. Hg pressure. The product solidifies to a colorless crystalline mass melting at 62–64° C.

$Analysis.$—$C_{16}H_{24}O_3$ Calculated: C, 72.69%; H, 9.15%. Found: C, 72.52%; H, 9.11%.

150 parts of 2-methyl-4:6-di-[Δ³'-cyclohexenyl]-trioxan are dissolved in 750 parts by volume of benzene. 25 parts of anhydrous sodium acetate and, in the course of 45 minutes, 250 parts of peracetic acid of 42% strength are stirred in in portions. The temperature is maintained by cooling at 30° C. After another 60 minutes at about 30° C., 98% of the theoretical amount of peracetic acid have been consumed. The solution is washed 3 times with 350 parts of water and twice with 300 parts by volume of 2 N-sodium carbonate solution on each occasion, dried over sodium sulfate, filtered and evaporated. The last remnants of solvent are removed in a high vacuum at 120° C. Yield: 150 parts of a resin containing 6.2 epoxide equivalents per kg.

A homogeneous mixture is prepared at about 115° C. of 60 parts of the epoxy resin obtained as described above and 27.7 parts of phthalic anhydride, and the mixture is charged into an aluminum mould. After hardening for 19 hours at 120° C. and for 24 hours at 160° C. a clear, hard casting is obtained which is completely insoluble in organic solvents.

EXAMPLE 5

A mixture of 108 parts of butyraldehyde, 165 parts of Δ³-tetrahydrobenzaldehyde and 350 parts by volume of ether is treated with 4 parts by volume of a boron trifluoride-ethyl ethereate solution of 47.8% strength. The reaction mixture is allowed to stand for 15 hours, and the crystalline trimeric Δ³-tetrahydrobenzaldehyde is filtered off. The filtrate is washed twice with 50 parts of 2 N-sodium carbonate solution and twice with 100 parts of water on each occasion, dried over sodium sulfate, filtered and evaporated. The residue is mixed with 0.2 part of anhydrous sodium carbonate and then distilled. 2-n-propyl-4:6-di-[Δ³'-cyclohexenyl]-trioxan passes over at 101–108° C. under 0.005 mm. Hg pressure.

A solution of 20 parts of 2-n-propyl-di-[Δ³'-cyclohexenyl]-trioxan in 100 parts by volume of benzene is treated with 3 parts of anhydrous sodium acetate and then, within 25 minutes, with 30 parts of peracetic acid of 42% strength added in portions. The temperature is maintained by cooling at 30° C. The mixture is allowed to react for another 50 minutes at 30° C. and then washed with water and sodium carbonate solution to remove all the acid. The solution is dried over sodium sulfate, filtered and evaporated, to yield 19 parts of crystalline epoxide containing 4.3 epoxide equivalents per kg.

What is claimed is:
1. Epoxy compounds of the formula

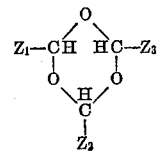

in which $Z_1$ and $Z_2$ each represent a radical of the formula

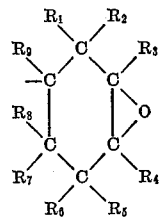

where $R_1$ to $R_9$ each are selected from the group consisting of alkyl of 1 to 4 carbon atoms and the hydrogen atom, and in which $Z_3$ is selected from the group consisting of radicals $Z_1$, radicals $Z_2$, and lower alkyl.
2. The epoxy compound of the formula
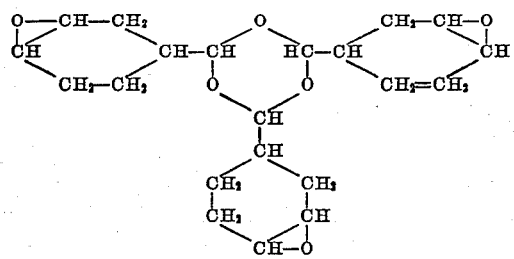
3. The epoxy compound of the formula
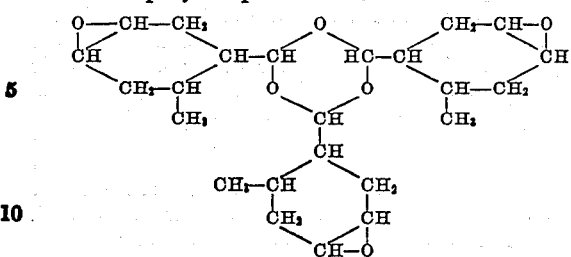
References Cited in the file of this patent
Nazarov et al.: Chem. Abs., vol. 51, pp. 16316–17 (1957).

UNITED STATES PATENT OFFICE
CERTIFICATE OF CORRECTION

Patent No. 2,991,293                      July 4, 1961

Hans Batzer et al.

It is hereby certified that error appears in the above numbered patent requiring correction and that the said Letters Patent should read as corrected below.

Column 3, line 17, for "-terahydro-" read -- -tetrahydro- --; line 24, for "polyhdroxy" read -- polyhydroxy --; column 5, line 35, in the table, heading to second column, for "Composition of epoxy mixture" read -- Composition of epoxy resin mixture --; column 7, line 8, right-hand moiety of the formula, strike out the double bond between the two $CH_2$s.

Signed and sealed this 28th day of November 1961.

(SEAL)
Attest:

ERNEST W. SWIDER
Attesting Officer

DAVID L. LADD
Commissioner of Patents